United States Patent [19]

Peterson

[11] 4,427,089
[45] Jan. 24, 1984

[54] STEERABLE DRIVE AXLE WITH LARGE CRAMP ANGLE

[75] Inventor: John G. Peterson, San Jose, Calif.

[73] Assignee: FMC Corporation, Chicago, Ill.

[21] Appl. No.: 367,330

[22] Filed: Apr. 12, 1982

[51] Int. Cl.³ ............................................. B60K 17/30
[52] U.S. Cl. .................................... 180/253; 180/159; 384/126
[58] Field of Search ............... 180/253, 153, 154, 159, 180/161, 254, 255, 256, 257, 258, 259, 260, 261, 262, 263, 242; 280/492; 384/126

[56] References Cited

U.S. PATENT DOCUMENTS

| | | | |
|---|---|---|---|
| 3,189,119 | 6/1965 | Moreno et al. | 180/153 |
| 3,295,626 | 1/1967 | Cadiou | 180/263 |
| 3,315,759 | 4/1967 | Bohlen | 180/153 |
| 3,666,127 | 5/1972 | Guyaux | 214/512 |
| 3,865,207 | 2/1975 | Schwab et al. | 180/253 |

Primary Examiner—John A. Pekar
Assistant Examiner—D. Lynn Fugate
Attorney, Agent, or Firm—A. J. Moore; H. M. Stanley; R. B. Megley

[57] ABSTRACT

A steerable drive axle is disclosed having a cramp angle of about 45° for providing a short radius of turn for a vehicle. A trunnion assembly for each wheel includes upper and lower bearing units each having a spherical bearing and a king pin with a longitudinal axis. Axial misalignment of the king pins is corrected by the spherical bearings for enabling the upper and lower roller bearings to rotate about a common axis thereby minimizing bearing wear.

8 Claims, 4 Drawing Figures

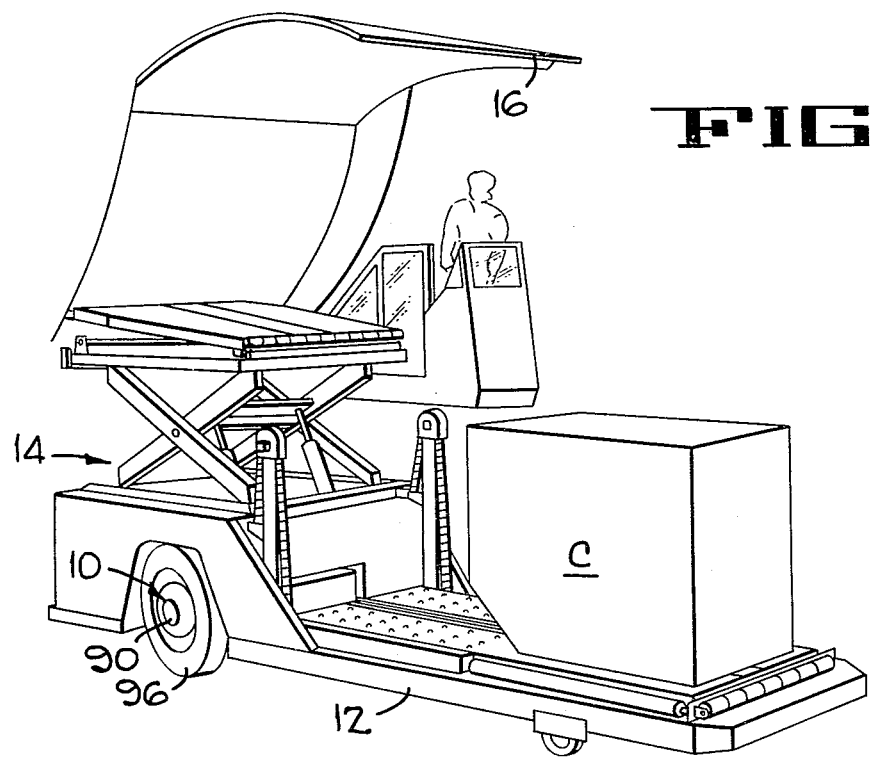
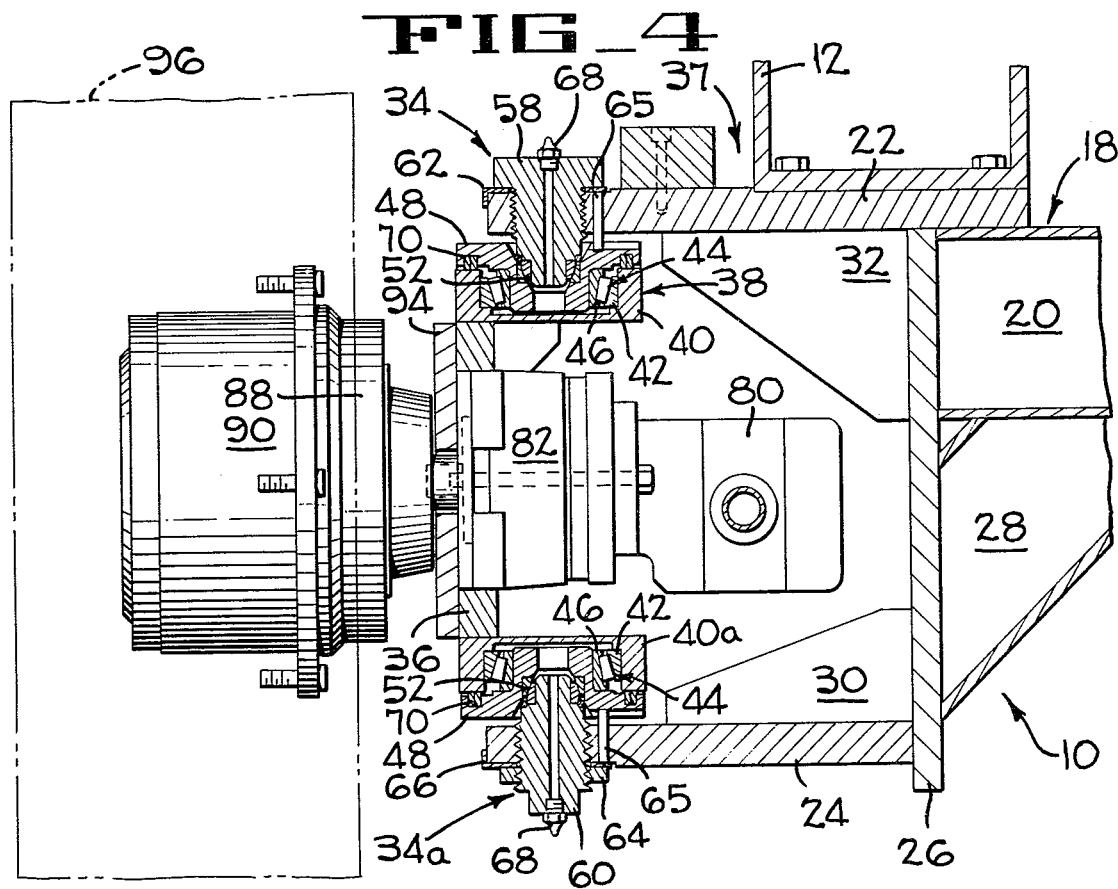

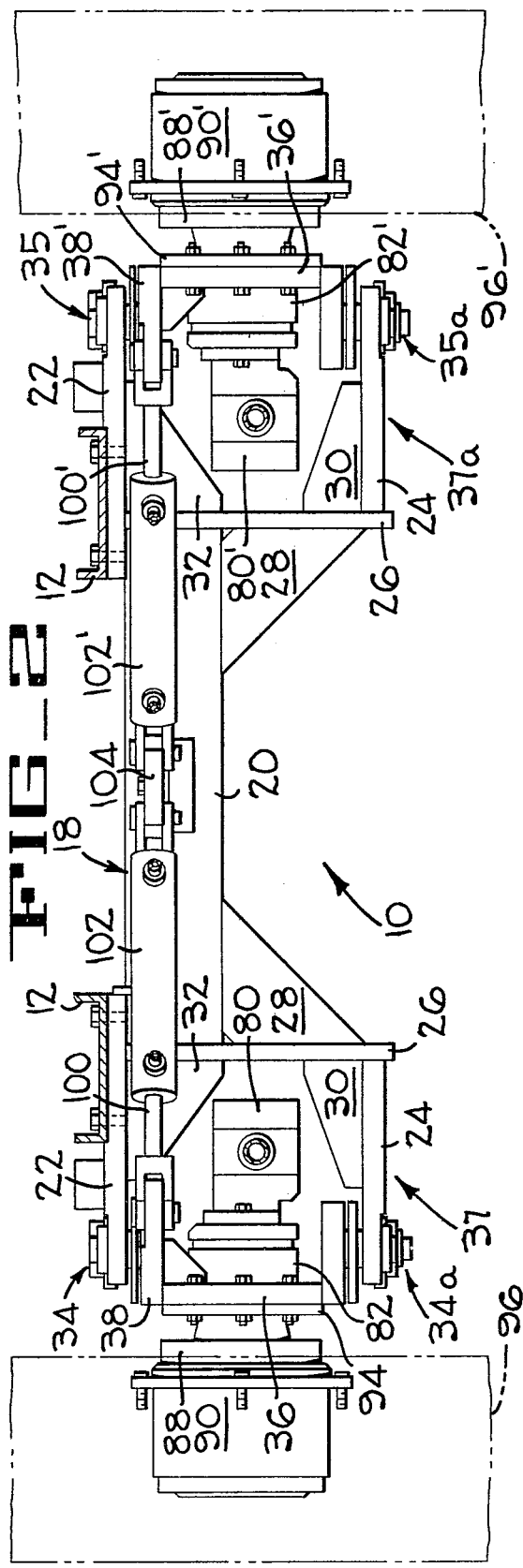
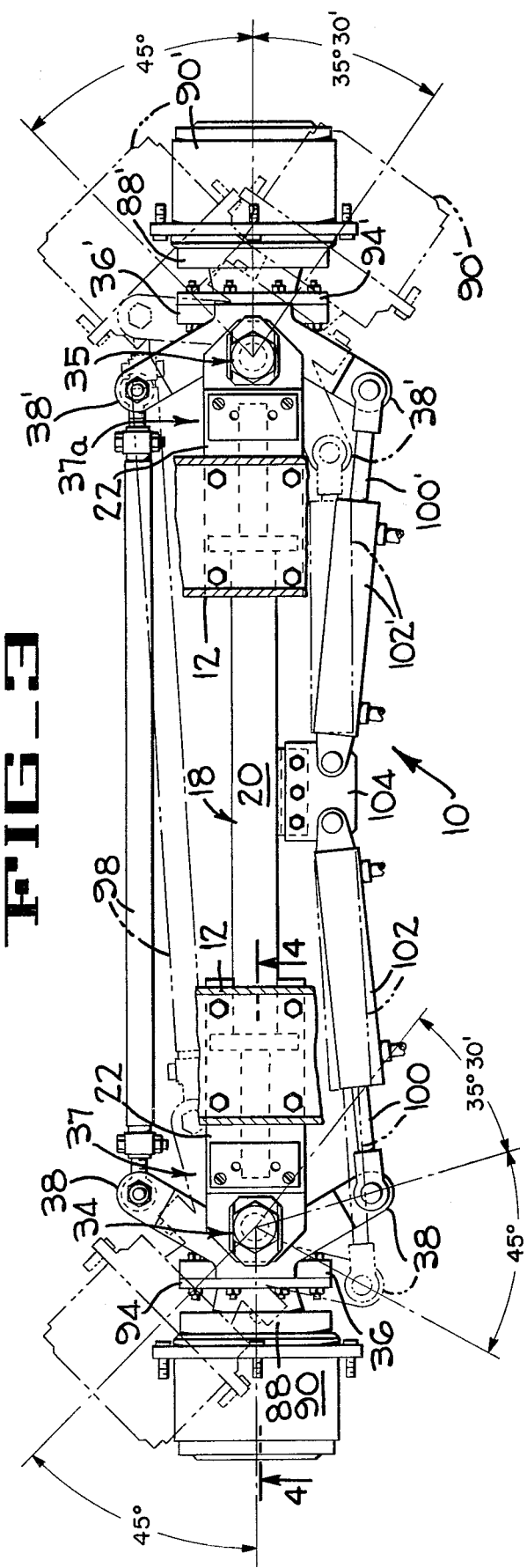

STEERABLE DRIVE AXLE WITH LARGE CRAMP ANGLE

BACKGROUND OF THE INVENTION

1. Field of the Invention

The present invention relates to steerable drive axles, for aircraft loaders or the like, capable of large cramp angles; and more particularly relates to such an axle which utilizes first sets of bearing surfaces for correcting pivot axis misalignment and second sets of bearing surfaces for allowing low stress pivotable movement about the resulting pivot axis.

2. Description of the Prior Art

Vehicles such as aircraft loaders or the like having steerable drive axles are well known in the art. One such aircraft loader is disclosed in assignee's U.S. Guyaux Pat. No. 3,666,127 which issued on May 30, 1972. The Guyaux type loader is capable of providing only about a 30° cramp angle, and the loader must be maneuvered into substantially aligned abutting engagement with an aircraft cargo door or the like. Many times the available area in which the loader is being maneuvered is quite small and therefore a small turning radius, or large cramp angle, is very desirable.

The problem of providing a small radius of turn was solved in some vehicles by providing the vehicle with a single centrally disposed driven wheel at the front of the vehicle and a pair of rear nondriven wheels. However, this type of three wheeled vehicle has the disadvantage of being unstable. Also, placement of a wheel centrally in front of the vehicle makes the accessability to the wheel for maintenance difficult, and also takes up a large amount of space which otherwise could be used for fuel tanks or the like.

It has been determined that an increase in the cramp angle, which decreases the radius of turn of the vehicle, makes it more difficult to maintain exact axial alignment of the top and bottom king pins during the turns. This misalignment, unless corrected, provides additional wear of the trunnion assembly bearings thereby reducing the life of the bearings.

SUMMARY OF THE INVENTION

In accordance with the present invention a steerable drive axle is provided which includes means for pivoting the wheel on the inside of the turn rearwardly to a cramp angle of about 45° relative to the longitudinal axis of the axle, while pivoting the other wheel forwardly about 35°30'. The upper and lower king pins are pivotally connected to the associated wheel trunnion assemblies by a pair of spherical bearings to accommodate king pin misalignment, and by a cooperating pair of beveled roller bearings to accommodate rotary motion of the spindles thereby improving the life of the bearings.

BRIEF DESCRIPTION OF THE DRAWINGS

FIG. 1 is a perspective illustrating the location of the steerable drive axle of the present invention in an operative position on an aircraft loader that is disposed adjacent the cargo door of an aircraft.

FIG. 2 is a front elevation of the steerable drive axle with the outline of the wheels being shown in phantom.

FIG. 3 is a top plan of FIG. 2 illustrating the wheel spindles in solid lines in a straight forward position, and in phantom lines when cramped 45° to make a right or left turn.

FIG. 4 is an enlarged vertical section of one wheel illustrating the two sets of bearings for pivotally connecting the king pins to the trunnion assembly.

DESCRIPTION OF THE PREFERRED EMBODIMENT

The steerable drive axle 10 of the present invention is illustrated in its preferred embodiment in FIG. 1 as being connected to the chassis 12 of an aircraft loader 14 for supporting the front end of the vehicle. The loader 14 is self propelled by an engine (not shown) and is illustrated in loading position at the cargo door 16 for transferring a container C between the aircraft and the loader. It will be understood, however, that the steerable drive axle 10 may be used on other types of vehicles.

The steerable axle 10 (FIGS. 2 and 3) comprises a fabricated transversely extending axle assembly 18 which includes a central beam 20 having, on each end thereof, upper and lower horizontal king pin supporting plates 22,24 rigidly connected thereto and to a vertical plate 26. The several components of the axle assembly 18 are welded together and are stiffened by gussets 28,30,32 welded thereto. The king pin supporting plates 22 of the axle assembly 18 are connected to the chassis 12 of the vehicle by threaded connectors or the like.

As best shown in FIGS. 2 and 4, upper and lower bearing units 34,34a are provided on the right side of the axle assembly 18, and similar upper and lower bearing units 35,35a are provided on the left side of the axle assembly.

The right bearing units 34,34a form portions of a right wheel trunnion assembly 37 (FIGS. 2, 3 and 4). A bearing supporting ring 36 having a generally Y-shaped actuating arm 38 is formed integrally therewith at the upper end thereof. Upper and lower roller bearings housings 40,40a are rigidly secured to the ring 36. Each bearing housing is bored to receive the outer race 42 of a beveled roller bearing 44. An inner race 46 of each beveled roller bearing is received in an annular thrust bushing housing 48 which is bored to receive the outer race of a spherical bearing 52. An inner race of each of the spherical bearings 52 is in sliding engagement with the outer race and is mounted on a small diameter, shouldered portion of an associated upper or lower king pin 58,60. The king pins 58,60 are threaded into the upper plate 22 and the lower plate 24, respectively. The upper king pin 58 has a large hexagonal head formed integrally therewith and is screwed into firm engagement with a locking washer 62 which then has portions thereof bent into locking engagement with the hexagonal head and the upper plate 22.

The lower king pin 60 has a small hexagonal head formed thereon and is screwed into the lower plate 24 until engaging the thrust bushing with the desired force. A locknut 64 is then screwed onto the king pin 60 and against a lock washer 66 which is then bent into locking engagement with both the locknut 64 and the lower plate 24. Roll pins 65 are supported in holes in the upper and lower plates 22,24 and have end portions held in slots in the associated thrust bushing housings 48 to prevent rotation thereof.

The king pins 58,60 are each provided with grease fittings 68 which are screwed into passages that extend through the king pins for directing grease to the bearing housing 40 thereby lubricating both bearings associated with each housing 40. Felt seal strips 70 are disposed between the bearing housing 40 and the associated thrust bushing housing 48; and an O-ring is disposed between a shoulder on each king pin and an adjacent surface of the associated thrust bushing housing 48. Thus, the felt strips 70 and the O-rings keep dust out of and maintain lubricant in the bearings 44 and 52.

As mentioned previously the upper and lower bearing units 34,34a each includes a spherical bearing 52 and a roller bearing 44. The upper and lower spherical bearings 52 cooperate to compensate and correct axial misalignment between the associated upper and lower bearing units. Accordingly, forces due to misalignment acting on the thus aligned roller bearings 44 are eliminated thereby substantially increasing the life of the bearing units 34,34a.

The right and left wheel trunnion assemblies 37, 37a (FIGS. 2 and 3) are mirror images of each other. Accordingly, only the components connected to the right hand trunnion assembly 37 will be described in detail. Equivalent parts of the left trunnion assembly 37a will be assigned the same numerals followed by a prime (') when needed.

The housing of a conventional hydraulic motor 80 (FIG. 2) is bolted to the housing of a conventional spring set-hydraulically released brake 82 such as an Ausco Model 334–74 brake. The stationary housings of the spring set brake 82 and the stationary housing 88 of the planetary reducer 90 are bolted to an annular plate 94 and to the bearing support ring 36 of the trunnion assembly 37. A conventional drive train (not shown) interconnects the rotary portion of the hydraulic motor 80 to the rotary portion of the planetary reducer 90 to which a drive wheel 96 (FIG. 1) is bolted.

As best shown in FIG. 3, the rear portions of the Y-shaped arms 38,38' are pivotally connected together by a tie rod 98. The front portions of the Y-shaped arms 38,38' are pivotally connected to piston rods 100,100' of hydraulic cylinders 102,102'. The cylinders 102,102' are pivotally connected to a bracket 104 bolted to the axle assembly 18.

A conventional hydraulic circuit (not shown) may be used to hydraulically release the spring set-hydraulically released brakes 82,82' and to drive the hydraulic motors 80,80' in either direction under the control of the operator of the vehicle. Also, any conventional operator controlled hydraulic system or hydraulic assist system (not shown) may be used to direct hydraulic fluid into opposite ends of the two steering cylinders 102,102'.

In operation, an operator who wishes to turn the vehicle to the right, will operate steering controls, such as a steering wheel (not shown), to direct high pressure fluid into the closed end of cylinder 102 and into the rod end of cylinder 102' thereby pivoting the planetary reducer 90 (and the wheel thereon) up to a cramp angle of about 45° from the longitudinal axis of the axle assembly 18 as indicated at the left in FIG. 3. This 45° cramp angle is substantially larger than the 30° cramp angle of the prior art Guyaux U.S. Pat. No. 3,666,127 thus making the turning radius much smaller and much easier to maneuver the vehicle 14 into loading and unloading position. As indicated in dotted lines at the right of FIG. 3, when the right planetary reducer 90 is at its cramp angle of 45°, the planetary reducer 90' on the opposite or outside of the turn makes an angle of about 35°30' forward of the longitudinal axis of the axle assembly 18. Similarly, if the operator wishes to make a left turn, he operates the steering wheel in the opposite direction resulting in a left cramp angle of the planetary reducer 90' of about 45° as indicated at the right of FIG. 1. During left turns, the hydraulic fluid is directed into the closed end of the cylinder 102' and the rod end of the cylinder 102.

As is apparent from FIG. 4, if the pivot axes of the king pins 58 and 60 are misaligned at assembly, or later become misaligned due to operation or wear, the inner and outer races of the upper and lower spherical bearings 52 will shift so that the outer races 42 of the upper and lower roller bearings 44 will rotate about a common axis when the planetary reducers are steered to turn the vehicle.

From the foregoing description it is apparent that an improved steering drive axle is disclosed which is capable of a cramp angle on the inside of a turn of 45°; and also includes upper and lower bearing units for each trunnion assembly. The upper and lower bearing units each include a roller bearing and a spherical bearing. The spherical bearings in each cooperating trunnion assembly corrects misalignment of the roller bearings so that the outer races of the roller bearings will rotate about a common axis thereby greatly reducing friction and wear when the vehicle is steered.

Although the best mode contemplated for carrying out the present invention has been herein shown and described, it will be apparent that modification and variation may be made without departing from what is regarded to be subject matter of the invention.

What is claimed is:

1. A steerable drive axle for a vehicle for rotating a wheel about a drive axis and for turning the wheel about a steering axis substantially normal to the drive axis; comprising means defining a pair of spaced king pins in substantial axial alignment with said steering axis, means defining a trunnion assembly, wheel drive power means supported by said trunnion assembly and operatively connected to said wheel, means defining spaced pairs of bearing units in substantial alignment with said steering axis and connecting said trunnion assembly to said king pins, each pair of bearing units including a spherical bearing and a roller bearing, and means for turning said trunnion assembly about said steering axis for pivoting said wheel about said steering axis an amount sufficient to provide a 45° cramp angle.

2. An apparatus according to claim 1 wherein said spherical bearings compensate for misalignment of the axis of said king pins for establishing a steering axis which is concentric with both of said roller bearings.

3. A steerable drive axle for a vehicle for rotating a wheel about a drive axis and for turning the wheel about a steering axis substantially normal to the drive axis; comprising means defining a pair of spaced king pins in substantial axial alignment with said steering axis, means defining a trunnion assembly, wheel driven power means supported by said trunnion assembly and operatively connected to said wheel, means defining spaced pairs of bearing units in substantial alignment with said steering axis and connecting said trunnion assembly to said king pins, each pair of bearing units including a spherical bearing and a roller bearing, means for turning said trunnion assembly about said steering axis, each bearing unit additionally comprising a thrust bushing housing, means for holding said thrust bushing housing from rotation relative to the associated king pin, said thrust bushing housing having an outer race of the spherical bearing and an inner race of said roller bearing rigidly secured thereto whereby axial misalignment is compensated for by said spherical bearing and rotary motion about said steering axis is accommodated solely by said roller bearings.

4. An apparatus according to claim 3 wherein said roller bearings are beveled roller bearings.

5. A steerable drive axle for a vehicle for rotating a pair of wheels about separate drive axes and for turning each wheel about an associated steering axis substantially normal to the associated drive axis; comprising means defining an axle assembly secured to the vehicle and extending transversely thereof, a pair of vertically spaced king pins secured to each end portion of said axle assembly and each pair of king pins being disposed in substantial axial alignment with said associated steering axis, means defining a trunnion assembly for each wheel, each trunnion assembly including a first lever arm projecting transversely away from the longitudinal axis of said axle assembly in one direction and at least one of said trunnion assemblies including a second lever arm projecting transversely away from said longitudinal axis in the opposite direction, wheel driving power means supported by each trunnion assembly and operatively connected to the associated wheel, means defining vertically spaced pairs of bearing units in substantial alignment with said associated steering axis and connecting each trunnion to the associated pair of king pins; each pair of bearing units including a spherical bearing and a roller bearing, a tie rod pivotally connected to said first lever arms on the same side of said longitudinal axis of said axle assembly for transmitting movement from one trunnion assembly to another, and power steering means supported by the vehicle and connected to said second lever arm on the other side of said axle assembly axis for simultaneously pivoting the trunnion assemblies and wheels about said associated steering axes through amounts sufficient to provide 45° cramp angles.

6. An apparatus according to claim 5 wherein said power steering means is capable of pivoting the wheel on the inside of the turn to a cramp angle of about 45° relative to the longitudinal axis of the assembly while the wheel on the other side of the axle assembly pivots about 35°30′.

7. An apparatus according to claim 5 wherein said spherical bearings compensate for misalignment of the steering axes of each associated pair of king pins for establishing steering axes which are concentric with both of the associated roller bearings.

8. An apparatus according to claim 5 wherein said wheel driving power means for each wheel comprises a reversible hydraulic motor, a spring set-hydraulically released brake, and a planetary reducer connected to the associated wheel.

* * * * *